US012112590B2

(12) United States Patent
Odate et al.

(10) Patent No.: US 12,112,590 B2
(45) Date of Patent: Oct. 8, 2024

(54) CONTACT DETECTION DEVICE

(71) Applicant: HONDA MOTOR CO., LTD., Tokyo (JP)

(72) Inventors: Shotaro Odate, Wako (JP); Kotaro Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 17/673,248

(22) Filed: Feb. 16, 2022

(65) Prior Publication Data

US 2022/0270416 A1 Aug. 25, 2022

(30) Foreign Application Priority Data

Feb. 24, 2021 (JP) .................................. 2021-027713

(51) Int. Cl.
*G07C 5/08* (2006.01)
*B60W 60/00* (2020.01)
(Continued)

(52) U.S. Cl.
CPC ............. *G07C 5/0808* (2013.01); *G01D 5/24* (2013.01); *G01D 18/00* (2013.01); *G07C 5/0816* (2013.01);
(Continued)

(58) Field of Classification Search
CPC ...... G07C 5/0808; G07C 5/0816; G01D 5/24; G01D 18/00; G01D 3/08; B60W 60/005; B60W 2540/18; G01R 27/26
See application file for complete search history.

(56) References Cited

U.S. PATENT DOCUMENTS 11,104,367 B2 8/2021 Odate
2014/0239984 A1* 8/2014 Alameh ................... G01R 1/04
324/686
(Continued)

FOREIGN PATENT DOCUMENTS

| JP | 2016-203660 A | 12/2016 |
| JP | 2019-023011 A | 2/2019 |
| JP | 2019-023012 A | 2/2019 |

OTHER PUBLICATIONS

Office Action dated Dec. 23, 2022, issued in Counterpart JP Application No. 2021-027713, with Partial English translation. (4 pages).

(Continued)

*Primary Examiner* — Jason Holloway
*Assistant Examiner* — Madison B Emmett
(74) *Attorney, Agent, or Firm* — WHDA, LLP (57) ABSTRACT

A contact detection device includes an electrostatic capacitance sensor provided on a steering wheel of a vehicle, and configured to detect contact of a human body with the steering wheel, an estimation unit configured to estimate whether the human body is in contact with the steering wheel, and a diagnosis unit configured to conduct a failure diagnosis related to the electrostatic capacitance sensor, based on a detection result of the electrostatic capacitance sensor in a case where the estimation unit estimates that the human body is in contact with the steering wheel and a detection result of the electrostatic capacitance sensor in a case where the estimation unit estimates that the human body is in no contact with the steering wheel.

12 Claims, 6 Drawing Sheets

(51) Int. Cl.
*G01D 5/24* (2006.01)
*G01D 18/00* (2006.01)

(52) U.S. Cl.
CPC ....... *B60W 60/005* (2020.02); *B60W 2540/18* (2013.01)

(56) References Cited

U.S. PATENT DOCUMENTS

| | | | |
|---|---|---|---|
| 2014/0312921 A1* | 10/2014 | Ueno | G01R 27/2605 |
| | | | 324/663 |
| 2016/0302730 A1 | 10/2016 | Odate | |
| 2017/0351256 A1* | 12/2017 | Kumakiri | B60W 60/0053 |
| 2018/0118247 A1* | 5/2018 | Odate | B60R 1/04 |
| 2018/0316197 A1* | 11/2018 | Zhang | H02J 7/0019 |
| 2019/0023310 A1 | 1/2019 | Odate | |
| 2019/0245474 A1* | 8/2019 | Gotou | H02P 23/14 |
| 2020/0021104 A1* | 1/2020 | Song | H02H 1/0007 |
| 2020/0290566 A1* | 9/2020 | Yamazaki | B62D 1/046 |
| 2021/0371001 A1* | 12/2021 | Osako | B62D 1/046 |

OTHER PUBLICATIONS

Office Action dated Jul. 15, 2022, issued in counterpart JP application No. 2021-027713, with partial English translation. (4 pages).

\* cited by examiner

|  | PREVIOUS VALUE | CURRENT VALUE |
|---|---|---|
| NON-CONTACT ESTIMATION CASE | ... | ... |
| CONTACT ESTIMATION CASE | ... | ... |

CONTACT DETECTION DEVICE

CROSS-REFERENCE TO RELATED APPLICATION(S)

This application claims priority to and the benefit of Japanese Patent Application No. 2021-027713 filed on Feb. 24, 2021, the entire disclosure of which is incorporated herein by reference.

BACKGROUND OF THE INVENTION

Field of the Invention

The present invention relates to a contact detection device.

Description of the Related Art

In order to determine whether an occupant of a vehicle grips a steering wheel, a detection device using an electrostatic capacitance sensor is known (Japanese Patent Laid-Open No. 2016-203660 and the like). The detection result is used, for example, for switching from automated driving to manual driving, driving assistance, and the like.

When a failure such as a disconnection occurs in a circuit of the electrostatic capacitance sensor, the electrostatic capacitance fluctuates, and affects detection accuracy. For example, in a case of an open failure in which a ground line is disconnected, the reference potential fluctuates, and affects the detection accuracy.

SUMMARY OF THE INVENTION

An object of the present invention is to provide a technique capable of conducting a failure diagnosis related to an electrostatic capacitance sensor.

According to an aspect of the present invention, there is provided a contact detection device comprising: an electrostatic capacitance sensor provided on a steering wheel of a vehicle, and configured to detect contact of a human body with the steering wheel; an estimation unit configured to estimate whether the human body is in contact with the steering wheel; and a diagnosis unit configured to conduct a failure diagnosis related to the electrostatic capacitance sensor, based on a detection result of the electrostatic capacitance sensor in a case where the estimation unit estimates that the human body is in contact with the steering wheel and a detection result of the electrostatic capacitance sensor in a case where the estimation unit estimates that the human body is in no contact with the steering wheel.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Hereinafter, embodiments will be described in detail with reference to the accompanying drawings. Note that the following embodiments do not limit the invention according to the claims, and all combinations of features described in the embodiments are not necessarily essential to the invention. Two or more features of a plurality of features described in the embodiments may be optionally combined. In addition, the same or similar constituent elements are denoted by the same reference numerals, and overlapping descriptions will be omitted.

Figure 1:
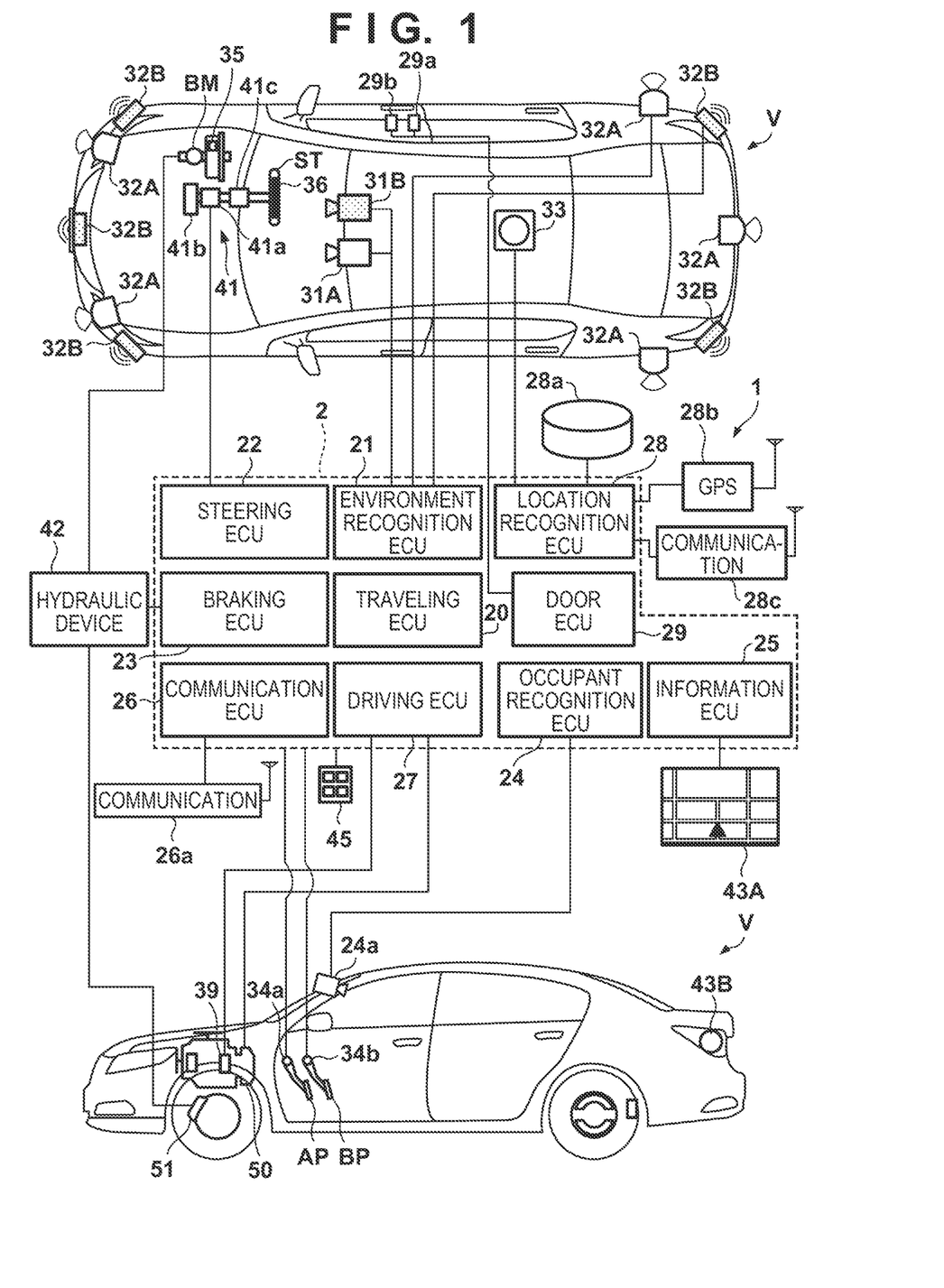
FIG. 1 is a block diagram of a vehicle and a control device.

FIG. 1 is a block diagram of a vehicle V, to which the present invention is applicable, and a control device 1 of the vehicle V. In FIG. 1, the vehicle V is schematically illustrated in a plan view and a side view. The vehicle V is, for example, a four-wheeled passenger vehicle of a sedan type.

The vehicle V in the present embodiment is, for example, a parallel hybrid vehicle. In this case, a power plant 50, which is a travel driving unit that outputs driving force for rotating driving wheels of the vehicle V, can include an internal combustion engine, a motor, and an automatic transmission. The motor can be used as a drive source for accelerating the vehicle V, and can also be used as a generator at the time of deceleration or the like (regenerative braking).

<Control Device>

Referring to FIG. 1, a configuration of a control device 1 of the vehicle V will be described. The control device 1 includes an ECU group (control unit group) 2. The ECU group 2 includes a plurality of ECUs 20 to 29 configured to be capable of communicating with one another. Each ECU includes a processor represented by a CPU, a storage device such as a semiconductor memory or the like, an interface with an external device, and the like. The storage device stores programs executed by the processor, data used for processes performed by the processor, and the like. Each ECU may include a plurality of processors, storage devices, interfaces, and the like. Note that the number of ECUs and the functions assigned to the ECUs can be designed as appropriate, and can be subdivided or integrated, when compared with the present embodiment. Note that, in FIG. 1, names of representative functions of the ECUs 20 to 29 are given. For example, the ECU 20 is expressed as "traveling ECU".

The ECU 20 conducts control related to traveling assistance including automated driving of the vehicle V. In the automated driving, driving (acceleration or the like of the vehicle V by the power plant 50), steering, and braking of the vehicle V are automatically conducted without necessitating an occupant's operation. Further, the ECU 20 is capable of conducting, for example, traveling assistance control such as collision reduction brake and lane deviation suppression in the manual driving. The collision reduction brake instructs activation of a brake device 51 to assist collision avoidance, when the possibility of collision with an obstacle present ahead increases. The lane deviation suppression instructs activation of an electric power steering device 41 to assist lane deviation avoidance, when the possibility that the vehicle V deviates from a traveling lane increases. Further, the ECU 20 is capable of conducting automatic following control for causing the vehicle V to automatically follow a preceding vehicle in both the automated driving and the manual driving. In the case of the automated driving, all of acceleration, deceleration, and steering of the vehicle V may be conducted automatically. In the case of the manual driving, the acceleration and the deceleration of the vehicle V may be conducted automatically.

The ECU 21 is an environment recognition unit that recognizes a traveling environment of the vehicle V, based on detection results of detection units 31A, 31B, 32A, and 32B that respectively detect the surrounding conditions of the vehicle V. In the present embodiment, the detection units 31A and 31B are cameras that image ahead of the vehicle V (hereinafter referred to as a camera 31A and a camera 31B in some cases). By analyzing the images that have been captured by the camera 31A and the camera 31B, it is possible to extract a contour of a target object or extract a division line (white line or the like) of a lane on a road.

In the present embodiment, the detection unit 32A is a light detection and ranging (LiDAR) (hereinafter referred to as a LiDAR 32A in some cases), detects a target object in the surroundings of the vehicle V, and measures a distance to the target object. In the present embodiment, five LiDARs 32A are provided, including one at each corner portion of a front part of the vehicle V, one at the center of a rear part of the vehicle V, and one at each lateral side of the rear part of the vehicle V. The detection unit 32B is a millimeter-wave radar (hereinafter referred to as a radar 32B in some cases), detects a target object in the surroundings of the vehicle V, and measures a distance to the target object. In the present embodiment, five radars 32B are provided, including one at the center of the front part of the vehicle V, one at each corner portion of the front part of the vehicle V, and one at each corner portion of the rear part of the vehicle V.

The ECU 22 is a steering control unit that controls the electric power steering device 41. The electric power steering device 41 includes a mechanism that steers the front wheels in accordance with a driver's driving operation (steering operation) on a steering wheel ST. The electric power steering device 41 includes a drive unit 41a including a motor that exerts driving force for assisting a steering operation or automatically steering the front wheels (referred to as steering assist torque in some cases), a steering angle sensor 41b, a torque sensor 41c that detects steering torque burdened by the driver (referred to as steering burden torque to be distinguished from steering assist torque). The ECU 22 is also capable of acquiring a detection result of an electrostatic capacitance sensor 36 that detects whether the driver grips the steering wheel ST, and is capable of monitoring an occupant's gripping state of the steering wheel ST.

The ECU 23 is a braking control unit that controls a hydraulic device 42. A driver's braking operation on a brake pedal BP is converted into hydraulic pressure in a brake master cylinder BM, and is transmitted to the hydraulic device 42. The hydraulic device 42 is an actuator capable of controlling the hydraulic pressure of hydraulic oil supplied to a brake device (for example, a disc brake device) 51 provided on each of the four wheels, based on the hydraulic pressure that has been transmitted from the brake master cylinder BM, and the ECU 23 conducts drive control of an electromagnetic valve or the like included in the hydraulic device 42. In addition, the ECU 23 is capable of turning on a brake lamp 43B at the time of braking. This configuration enables a following vehicle to give more attention to the vehicle V.

The ECU 23 and the hydraulic device 42 can constitute an electric servo brake. The ECU 23 is capable of controlling, for example, the distribution of the braking force by the four brake devices 51 and the braking force by the regenerative braking of the motor included in the power plant 50. The ECU 23 is also capable of achieving an ABS function, traction control, and a posture control function of the vehicle V, based on detection results of wheel speed sensors (not illustrated) respectively provided for the four wheels, a yaw rate sensor (not illustrated), and a pressure sensor 35 that detects the pressure in the brake master cylinder BM.

The ECU 24 is an occupant recognition unit that detects an occupant in the vehicle, based on a detection result of an occupant detection unit 24a that detects an occupant. The recognition target may be all occupants, or may be only the occupant (driver) seated in the driver's seat. In the present embodiment, the occupant detection unit 24a is a camera that images the inside of the vehicle (hereinafter referred to as a camera 27a in some cases). It is possible to determine whether there is an occupant in the vehicle from the captured image of the camera 27a.

The ECU 25 is an in-vehicle notification control unit that controls an information output device 43A that notifies the inside of the vehicle of information. The information output device 43A includes, for example, a display device provided on a head-up display or an instrument panel, or a sound output device. A vibration device may further be included. The ECU 25 causes the information output device 43A to output, for example, failure information of the vehicle V, various types of information such as a vehicle speed and an outside air temperature, information such as route guidance, and information regarding a state of the vehicle V.

The ECU 26 includes a communication device 26a for vehicle-to-vehicle communication. The communication device 26a conducts wireless communication with other surrounding vehicles to exchange information between the vehicles.

The ECU 27 is a drive control unit that controls the power plant 50. In the present embodiment, one ECU 27 is allocated to the power plant 50, but one ECU may be allocated to each of the internal combustion engine, the motor, and the automatic transmission. The ECU 27 controls, for example, an output of the internal combustion engine or the motor, or switches a gear ratio of the automatic transmission to correspond to the driver's driving operation, the vehicle speed, or the like that has been detected by the operation detection sensor 34a provided on the accelerator pedal AP or the operation detection sensor 34b provided on the brake pedal BP. Note that the automatic transmission is provided with a rotation speed sensor 39, which detects the rotation speed of an output shaft of the automatic transmission, as a sensor that detects a traveling state of the vehicle V. The vehicle speed of the vehicle V can be calculated from the detection result of the rotation speed sensor 39.

The ECU 28 is a location recognition unit that recognizes the current location and the course of the vehicle V. The ECU 28 controls a gyro sensor 33, a GPS sensor 28b, and a communication device 28c, and performs an information process on a detection result or a communication result. The gyro sensor 33 detects a rotational motion of the vehicle V. The course of the vehicle V can be determined by the detection result and the like of the gyro sensor 33. The GPS sensor 28b detects the current location of the vehicle V. The communication device 28c conducts wireless communication with a server that provides map information and traffic information, and acquires these pieces of information. In a database 28a, map information with high accuracy can be stored, so that the ECU 28 is capable of specifying the location of the vehicle V on a vehicle lane with higher accuracy, based on the map information and the like.

The ECU 29 is a door control unit that performs control related to detection of opening and closing of a door of the vehicle V and a door lock. Each door of the vehicle V is provided with an electric door lock device 29a that locks and unlocks the door, and an opening detection sensor 29b that detects opening and closing of the door. The ECU 29 controls the electric door lock device 29a to lock and unlock the door, and acquires a detection result of the opening detection sensor 29b to recognize opening and closing of the door.

An input device 45 is disposed inside the vehicle so that an occupant is able to operate, and receives an input of an instruction or information from the occupant.

CONTROL EXAMPLE

Figure 2:
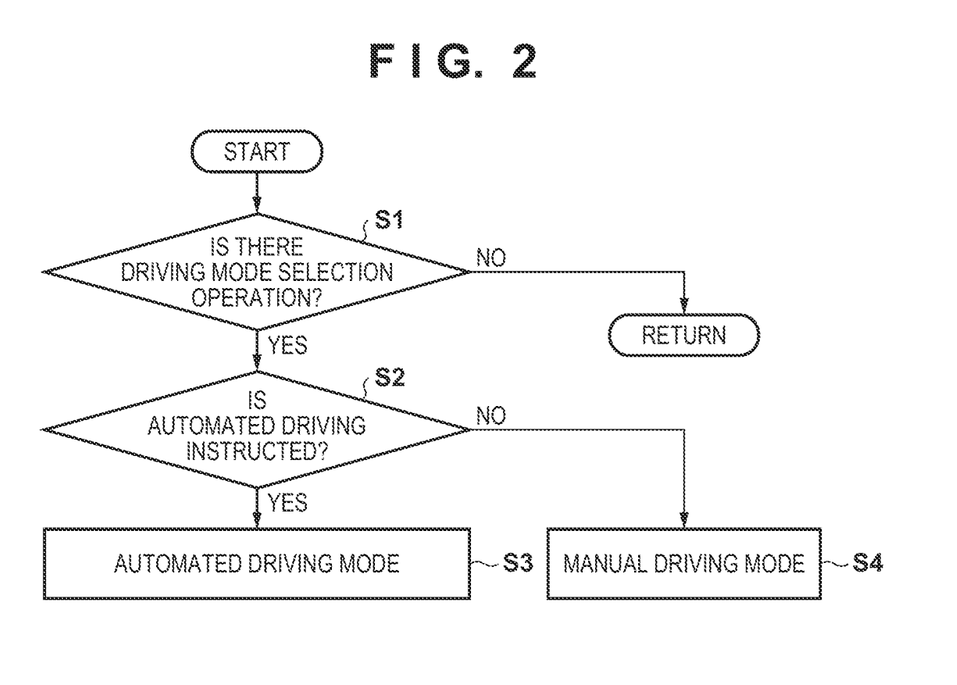
FIG. 2 is a flowchart illustrating an example of a process performed by the control device of FIG. 1.

A control example of the control device 1 will be described. FIG. 2 is a flowchart illustrating a mode selection process in driving control to be performed by the ECU 20.

In S1, it is determined whether a mode selection operation has been made by an occupant. For example, the occupant is able to give an instruction for switching between an automated driving mode and a manual driving mode by making an operation on the input device 45. In a case where there is a selection operation, the process proceeds to S2, and in other cases, the process ends.

In S2, it is determined whether such a selection operation is to instruct the automated driving. In a case where the selection operation is to instruct the automated driving, the process proceeds to S3, and in a case where the selection operation is to instruct the manual driving, the process proceeds to S4. In S3, the automated driving mode is set, and automated driving control is started. In S4, the manual driving mode is set, and manual driving control is started. The current setting regarding the driving control mode is notified from the ECU 20 to each of the ECUs 21 to 28, and is recognized.

In the automated driving control, the ECU 20 outputs a control command to the ECU 22, the ECU 23, and the ECU 27 to control the steering, braking, and driving of the vehicle V, and causes the vehicle V to automatically travel without depending on the occupant's driving operation. The ECU 20 sets a travel route of the vehicle V, and causes the vehicle V to travel along the travel route that has been set with reference to a location recognition result of the ECU 28 and the recognition result of the target object. The target object is recognized based on the detection results of the detection units 31A, 31B, 32A, and 32B. In the manual driving control, the driving, steering, and braking of the vehicle V are conducted in accordance with the driver's driving operation, and the ECU 20 appropriately performs the traveling assistance control.

<Contact Detection Device>

Figure 3A:
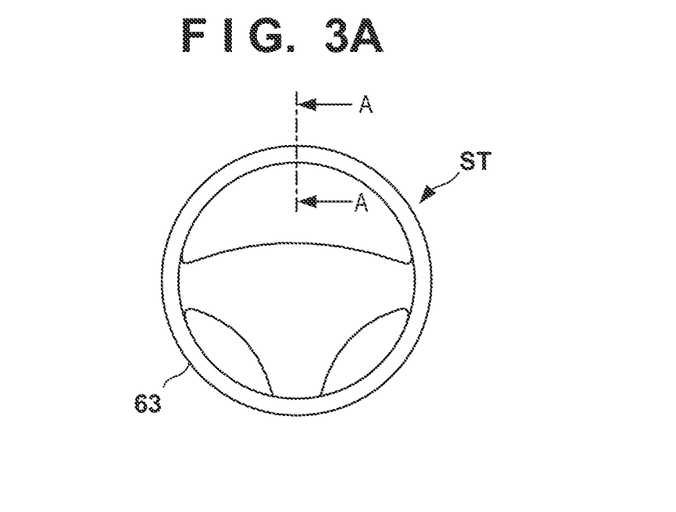
FIG. 3A is a schematic view of a steering wheel at a neutral position.
Figure 3B:
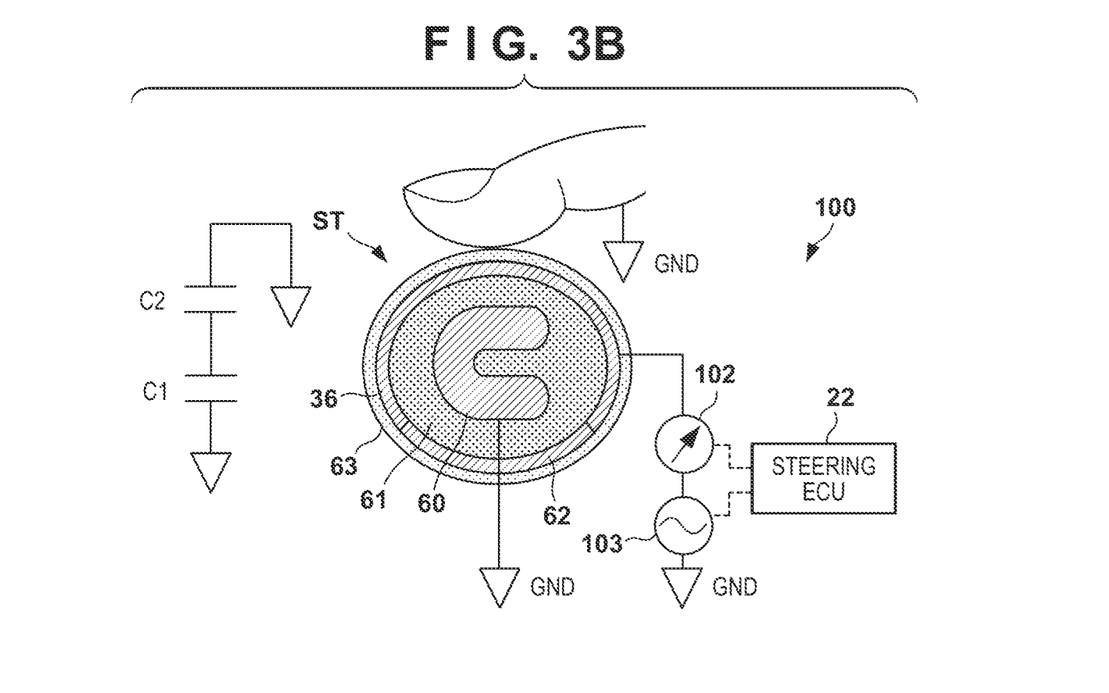
FIG. 3B is a cross-sectional view taken along line A-A of FIG. 3A and a block diagram of a contact detection device according to an embodiment of the present invention.

A contact detection device 100 according to an embodiment of the present invention will be described with reference to FIGS. 3A and 3B. FIG. 3A is a schematic view of the steering wheel ST at a neutral position. FIG. 3B is a block diagram illustrating a configuration of the contact detection device 100 together with a cross-sectional view taken along line A-A in FIG. 3A.

A rim part of the steering wheel ST includes a core metal 60 made of a conductive metal material. The core metal is grounded. The core metal 60 is entirely covered with a resin 61, which is an insulator. A part of the resin 61 is covered with the electrostatic capacitance sensor 36, and a remaining part is covered with an elastic member 62. The electrostatic capacitance sensor 36 and the elastic member 62 are covered with a skin 63, which is an insulator. The electrostatic capacitance sensor 36 in the present embodiment is an electrode. The electrostatic capacitance sensor 36 can be made up of a coating film of a conductive material or a sheet of a conductive material. The electrostatic capacitance sensor 36 extends in the circumferential direction of the rim part of the steering wheel ST.

A capacitor having a capacitance $C1$ is formed between the electrostatic capacitance sensor 36 and the core metal 60. As illustrated in FIG. 3B, when a human body comes into contact with the rim part of the steering wheel ST, a capacitor having a capacitance $C2$ is formed between the electrostatic capacitance sensor 36 and the human body. The human body is grounded when a part of the human body is in contact with another part of the vehicle V.

The contact detection device 100 includes the electrostatic capacitance sensor 36, a signal source 103 that supplies an AC signal to the electrostatic capacitance sensor 36, an electric current sensor 102 that detects an electric current between the electrostatic capacitance sensor 36 and the signal source 103, and the ECU 22. The ECU 22 is capable of controlling the signal source 103 and acquiring a detection result of the electric current sensor 102. When the human body is not in contact with the rim part of the steering wheel ST, the electric current sensor 102 detects an electric current proportional to the capacitance $C1$. When the human body is in contact with the rim part of the steering wheel ST, the electric current sensor 102 detects an electric current proportional to a combined capacitance of the capacitances $C1$ and $C2$ ($=C1+C2$). The detection result of the electric current sensor 102 enables the determination of whether the occupant is in contact with (grips) or is not in contact with (does not grip) the steering wheel ST.

Figure 4:
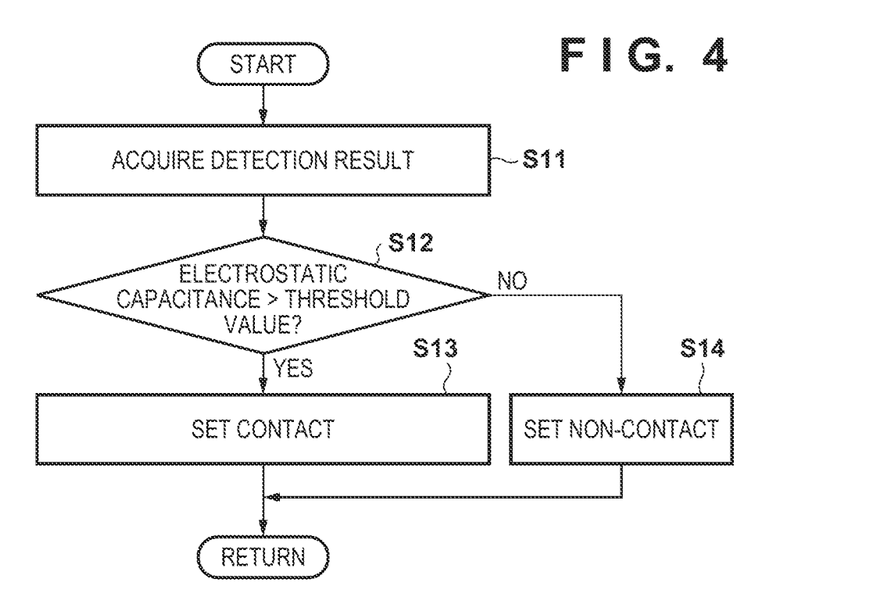
FIG. 4 is a flowchart illustrating an example of a contact determination process.

FIG. 4 illustrates an example of a determination process performed by the ECU 22. In switching the control of the vehicle V from the automated driving to the manual driving, for example, the ECU 22 performs such a determination process in order to confirm whether the occupant grips the steering wheel ST.

In S11, the ECU 22 drives the signal source 103, and then acquires a detection result of the electric current sensor 102. In step S12, it is determined whether the detection result (electrostatic capacitance) of the electric current sensor 102 exceeds a threshold value. In a case where the detection result exceeds the threshold value, the process proceeds to S13, and the contact (gripping) is set as a determination result. In a case where the detection result is equal to or less than the threshold value, the process proceeds to S14, and non-contact (non-gripping) is set as the determination result.

<Failure Diagnosis>

Figure 5:
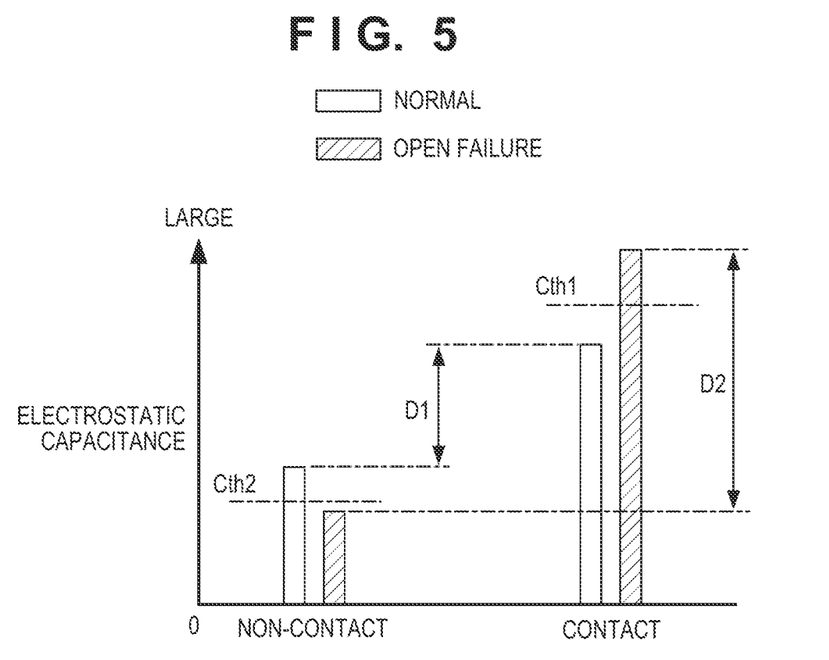
FIG. 5 is a diagram illustrating results of a fluctuation test example of an electrostatic capacitance in a normal time and in an open failure time.

In a case where there is a failure such as a disconnection in the circuit of the electrostatic capacitance sensor 36, the electrostatic capacitance fluctuates, and affects the detection accuracy. For example, in a case of an open failure in which the grounding wire of the core metal 60 is disconnected and the core metal 60 is not grounded, the reference potential fluctuates, and affects the detection accuracy. FIG. 5 illustrates results of a fluctuation test example of the electrostatic capacitance in a normal time and in an open failure time. In the case where the human body is not in contact with the steering wheel ST, that is, a non-contact state, the detected electrostatic capacitance in the open failure time is lower than that in the normal time. Conversely, in the case where the human body is in contact with the steering wheel ST, the detected electrostatic capacitance in the open failure time is higher than that in the normal time.

From these results, in the determination of gripping or non-gripping of the steering wheel ST of FIG. 4, in the open failure time, the threshold value has to be changed in the determination of S12 in FIG. 4.

In addition, whether the open failure has occurred can be diagnosed based on the tendency of the test results. As one example, there is a difference in the detection result of electrostatic capacitance between the non-contact time and the contact time. As illustrated in FIG. 5, a large difference occurs between a difference D1 in the detection result of the electrostatic capacitance in the normal time and a difference D2 in the detection result of the electrostatic capacitance in the open failure time. Therefore, the differences D between the detection results of the electrostatic capacitances are compared with a predetermined threshold value Dth (D1<Dth<D2). In a case where a relationship D>Dth is established, it can be determined that an open failure has occurred (referred to as a difference determination method).

In addition, as another example, as illustrated in FIG. 5, threshold values Cth1 and Cth2 are set. In a case where the detection result of the electrostatic capacitance in the contact time exceeds the threshold value Cth1 and the detection result of the electrostatic capacitance in the non-contact time is lower than the threshold value Cth2, it can be determined that an open failure has occurred (referred to as an individual determination method). The threshold value Cth1 is set to be larger than the detection result of the electrostatic capacitance at the contact time in the normal time, and the threshold value Cth1 is set to be smaller than the detection result of the electrostatic capacitance at the non-contact time in the normal time.

Figure 6:
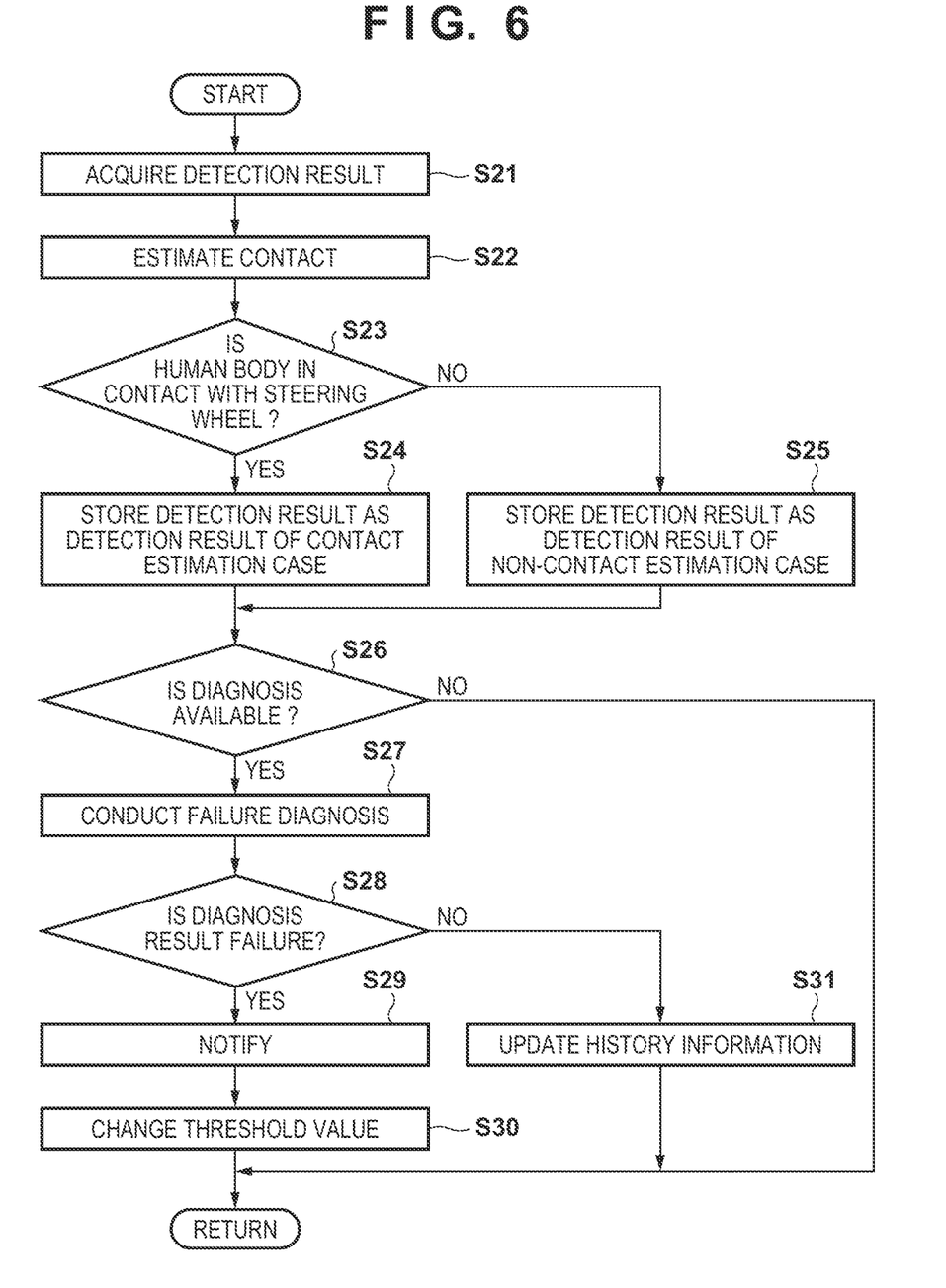
FIG. 6 is a flowchart illustrating an example of a failure diagnosis process.

FIG. 6 illustrates an example of a failure diagnosis process performed by the ECU 22. The ECU 22 periodically performs the process in FIG. 6, for example. In the failure diagnosis, whether the occupant is in contact with the steering wheel ST cannot be determined with reference to the detection result of the electrostatic capacitance. Hence, whether the occupant is in contact with the steering wheel ST is estimated, and the failure diagnosis is conducted based on an estimation result and a detection result of the electrostatic capacitance.

In S21, the ECU 22 drives the signal source 103, and then acquires a detection result of the electric current sensor 102. In step S22, whether the human body is in contact with the steering wheel ST is estimated. Whether the human body (occupant) is in contact with the steering wheel ST can be estimated from the state of the vehicle V or the detection result of the sensor included in the vehicle V.

As one example, in a case where the occupant detection unit 24a detects no occupant, it can be estimated that the human body is not in contact with the steering wheel ST, because there is no human present in the vehicle. In addition, in a case where the occupant detection unit 24a detects an occupant and the vehicle V is traveling, it can be estimated that the human body is in contact with the steering wheel ST (while driving). The ECU 22 is capable of acquiring a detection result of the occupant detection unit 24a via the ECU 24. In addition, the ECU 20 is capable of determining whether the vehicle V is traveling based on information from the ECU 22 and the ECU 27.

As another example, in a case where the electric door lock device 29a unlocks the locking and the opening detection sensor 29b does not detect the opening of the door, it is considered to be immediately before the occupant gets in the vehicle V. Hence, it can be estimated that the human body is not in contact with the steering wheel ST. In a case where the vehicle V is travelling after the opening detection sensor 29b detects the opening of the door, it can be estimated that the human body is in contact with the steering wheel ST (while driving). The ECU 22 is capable of acquiring the state of the electric door lock device 29a and the detection result of the opening detection sensor 29b via the ECU 29.

As still another example, in a case where the vehicle V is in the automated driving and the steering wheel ST is rotating from the neutral position, it can be estimated that the human body is not in contact with the steering wheel ST, because the electric power steering device 41 is automatically steering. In a case where the vehicle V is in the manual driving and the steering wheel ST is rotating from the neutral position, it can be estimated that the human body is in contact with the steering wheel ST (while driving). The ECU 22 is capable of determining whether the vehicle V is in the automated driving or in the manual driving from information from the ECU 20. In addition, the ECU 22 is capable of acquiring the detection result of the steering angle sensor 41b and determining whether the steering wheel ST is rotating from the neutral position.

Figure 7:
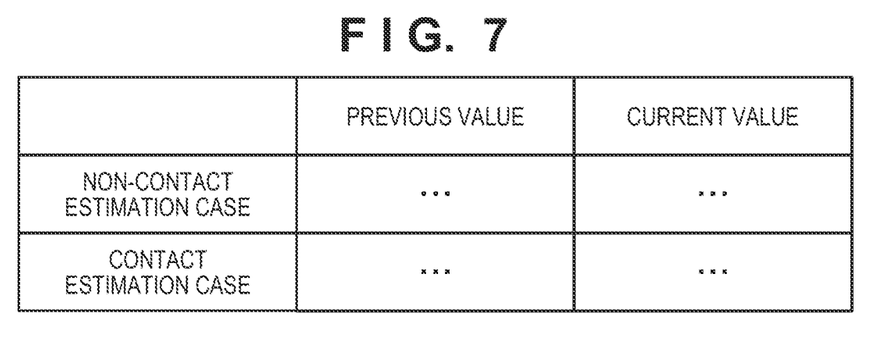
FIG. 7 is a diagram illustrating an example of history information.

In S23, as a result of the estimation in S22, in a case where it is estimated that the human body is in contact with the steering wheel ST, the process proceeds to S24, and in a case where it is estimated that the human body is not in contact with the steering wheel ST, the process proceeds to S25. In S24, the detection result acquired in S21 is stored as a detection result of a contact estimation case. In S25, the detection result acquired in S21 is stored as a detection result of a non-contact estimation case. The detection results in S24 and S25 are stored in, for example, a storage device included in the ECU 22 in a form of history information illustrated in FIG. 7. In the example of FIG. 7, the detection results of S24 and S25 are each stored as "current value". In "previous value", a value in a previous failure diagnosis time (a value when the normality is determined) is stored.

In S26, it is determined whether the failure diagnosis is available. It is determined that the failure diagnosis is available, in a case where the detection result (S24) in the contact case and the detection result (S25) in the non-contact case are both obtained. In a case where it is determined that the failure diagnosis is available, the process proceeds to S27. In S27, the failure diagnosis is conducted. Here, in the history information of FIG. 7, the failure diagnosis is conducted based on the detection result of the electrostatic capacitance of the contact estimation case stored as the "current value" and the detection result of the electrostatic capacitance of the non-contact estimation case.

The diagnosis method may be the above difference determination method or the above individual determination method. In addition, both the difference determination method and the individual determination method may be performed, and in a case where any one of the methods determines a failure, the failure may be determined. Alternatively, both the difference determination method and the individual determination method may be performed, and in a case where both methods determine failures, the failure may be determined.

The threshold value Dth in the case of adopting the difference determination method and the threshold values Cth1 and Cth2 in the case of adopting the individual determination method may be default values determined beforehand at the time of factory shipment of the vehicle V or the like, or may be values that have been set based on the "previous value" in the history information of FIG. 7. Alternatively, these threshold values may be default values at first, and may be values set based on the "previous value" in the history information after the "previous value" of the history information of FIG. 7 is set. In the case where the threshold value Dth is set based on the "previous value" in the history information, for example, the difference D1 in FIG. 5 is calculated from the "previous value" in the history information, and Dth=D1+a fixed value may be used. In addition, in a case where the threshold values Cth1 and Cth2 are set based on the "previous value" in the history information, for example, Cth1=the value of the contact estimation case+a fixed value may be set from the value of the contact estimation case of the "previous value" in the history information, and Cth2=the value of the non-contact estimation case−a fixed value may be set from the value of the non-contact estimation case. By utilizing the history information, it is possible to adaptively set a threshold value to an individual difference in detection accuracy of the electrostatic capacitance and a difference in the occupant.

In S28, it is determined whether the diagnosis result in S27 is a failure. In a case where the normality is determined, the process proceeds to S31, the "previous value" is updated with the "current value" in the history information of FIG. 7, and the process ends. In a case where the failure is determined, the process proceeds to S29 to notify the occupant that the failure has occurred in a grip detection function of the steering wheel ST. The notification can be given by the information output device 43A via the ECU 25. The notification may be a notification for prompting the occupant to carry out an inspection and a repair at a repair shop.

In S30, the threshold value in S12 in FIG. 4 is changed. In the case of the open failure, when the human body is in contact with the steering wheel ST, the electrostatic capacitance becomes larger than that in the normal time (FIG. 5). Therefore, for example, the threshold value is changed by adding a fixed value, or is changed to a value obtained by subtracting a fixed value from the value of the contact estimation case of the "previous value" in the history information. Accordingly, the determination of gripping the steering wheel ST (FIG. 4) can be continuously conducted.

As described heretofore, according to the present embodiment, it is possible to provide a technique capable of conducting a failure diagnosis related to the electrostatic capacitance sensor 36. In the failure diagnosis, the diagnosis is conducted using the detection results of the electrostatic capacitance of both the contact estimation case and the non-contact estimation case, and therefore the accuracy of the failure diagnosis can be improved. Although the detection results of the electrostatic capacitances of both the contact estimation case and the non-contact estimation case are used, these results are information that is usually acquirable when the user of the vehicle V uses the vehicle V once. Therefore, a long time is not needed for the failure diagnosis.

SUMMARY OF EMBODIMENTS

1. The contact detection device (100) in the above embodiments includes
an electrostatic capacitance sensor (36) provided on a steering wheel (ST) of a vehicle (V), and configured to detect contact of a human body with the steering wheel;
an estimation unit (22, S22) configured to estimate whether the human body is in contact with the steering wheel; and
a diagnosis unit (22, S27) configured to conduct a failure diagnosis related to the electrostatic capacitance sensor, based on a detection result of the electrostatic capacitance sensor in a case where the estimation unit estimates that the human body is in contact with the steering wheel and a detection result of the electrostatic capacitance sensor in a case where the estimation unit estimates that the human body is in no contact with the steering wheel.

According to this embodiment, it is possible to provide a technique capable of conducting a failure diagnosis related to an electrostatic capacitance sensor. In the failure diagnosis, the diagnosis is conducted using the detection results of the electrostatic capacitance of both the contact estimation case and the non-contact estimation case, and therefore the accuracy of the failure diagnosis can be improved. Although the detection results of the electrostatic capacitances of both the contact estimation case and the non-contact estimation case are used, these results are information that is usually acquirable when the user of the vehicle uses the vehicle once. Therefore, a long time is not needed for the failure diagnosis.

2. In the above embodiment,
the failure diagnosis is an open failure diagnosis of wiring.

According to this embodiment, it is possible to detect a disconnection or the like of the ground line that may occur in the steering wheel ST that is subject to a rotation operation.

3. In the above embodiment,
the diagnosis unit
conducts the failure diagnosis, based on a difference (D2) between the detection result of the electrostatic capacitance sensor in the case where the estimation unit estimates that the human body is in contact with the steering wheel and the detection result of the electrostatic capacitance sensor in the case where the estimation unit estimates that the human body is in no contact with the steering wheel.

According to this embodiment, it is possible to conduct the failure diagnosis in accordance with a characteristic of a change in electrostatic capacitance in the failure time.

4. In the above embodiment,
the diagnosis unit diagnoses a failure
in a case where the detection result of the electrostatic capacitance sensor of the case where the estimation unit estimates that the human body is in contact with the steering wheel exceeds a first threshold value (Cth1), and
in a case where the detection result of the electrostatic capacitance sensor of the case where the estimation unit estimates that the human body is in no contact with the steering wheel is lower than a second threshold value (Cth2).

According to this embodiment, it is possible to conduct the failure diagnosis in accordance with a characteristic of a change in electrostatic capacitance in the failure time.

5. In the above embodiment,
the first threshold value and the second threshold value are set, based on the detection result (the previous value in FIG. 7) of the electrostatic capacitance sensor before the diagnosis unit diagnoses the failure.

According to this embodiment, it is possible to adaptively set the threshold value to an individual difference in the detection accuracy of the electrostatic capacitance and a difference in the occupant.

6. In the above embodiment,
the vehicle includes an occupant detection unit (24a) configured to detect an occupant in the vehicle,
the estimation unit
estimates that the human body is in no contact with the steering wheel in a case where the occupant detection unit detects no occupant, and
the estimation unit
estimates that the human body is in contact with the steering wheel in a case where the occupant detection unit detects the occupant and the vehicle is traveling.

According to this embodiment, it is possible to estimate contact or non-contact by utilizing equipment and information of the vehicle.

7. In the above embodiment,
the vehicle includes:
an opening detection unit (29b) configured to detect an opening of a door; and
a door locking unit (29a) configured to lock the door to be a closed state,
the estimation unit
estimates that the human body is in no contact with the steering wheel in a case where the door locking unit releases locking and the opening detection unit detects no opening of the door, and
the estimation unit
estimates that the human body is in contact with the steering wheel in a case where after the opening detection unit detects the opening of the door, the vehicle is traveling.

According to this embodiment, it is possible to estimate contact or non-contact by utilizing equipment and information of the vehicle.

8. In the above embodiment,
the vehicle is capable of conducting automated driving,
the estimation unit
estimates that the human body is in no contact with the steering wheel in a case where the vehicle is in the automated driving and the steering wheel is rotating from a neutral position, and
the estimation unit
estimates that the human body is in contact with the steering wheel in a case where the vehicle is in manual driving and the steering wheel is rotating from the neutral position.

According to this embodiment, it is possible to estimate contact or non-contact by utilizing equipment and information of the vehicle.

9. The contact detection device in the above embodiment further includes
a notification unit (43A) configured to notify an occupant of a diagnosis result of the diagnosis unit.

According to this embodiment, it is possible to notify the occupant of an occurrence of the failure and to prompt the occupant to carry out inspection and repair.

10. The contact detection device in the above embodiment further includes:
a determination unit (22, S12) configured to compare a detection result of the electrostatic capacitance sensor with a threshold value to determine whether the human body is in contact with the steering wheel; and
a change unit (22, S30) configured to change the threshold value based on a diagnosis result of the diagnosis unit.

According to this embodiment, it is possible to determine whether the occupant grips the steering wheel also after a failure.

Heretofore, the embodiments of the invention have been described, The invention is not limited to the foregoing embodiments, and various variations/changes are possible within the spirit of the invention.

The invention is not limited to the foregoing embodiments, and various variations/changes are possible within the spirit of the invention.

What is claimed is:

1. A contact detection device comprising:
an electrostatic capacitance sensor provided on a steering wheel of a vehicle, and configured to detect contact of a human body with the steering wheel;
an estimation unit configured to estimate whether the human body is in contact with the steering wheel;
a diagnosis unit configured to conduct a failure diagnosis related to the electrostatic capacitance sensor, based on a detection result of the electrostatic capacitance sensor in a case where the estimation unit estimates that the human body is in contact with the steering wheel and a detection result of the electrostatic capacitance sensor in a case where the estimation unit estimates that the human body is in no contact with the steering wheel;
a determination unit configured to compare a detection result of the electrostatic capacitance sensor with a threshold value to determine whether the human body is in contact with the steering wheel; and
a change unit configured to change the threshold value when the diagnosis unit determines that a failure related to the electrostatic capacitance sensor occurs.

2. The contact detection device according to claim 1, wherein
the failure diagnosis is an open failure diagnosis of wiring.

3. The contact detection device according to claim 1, wherein
the diagnosis unit
conducts the failure diagnosis, based on a difference between the detection result of the electrostatic capacitance sensor in the case where the estimation unit estimates that the human body is in contact with the steering wheel and the detection result of the electrostatic capacitance sensor in the case where the estimation unit estimates that the human body is in no contact with the steering wheel.

4. The contact detection device according to claim 1, wherein
the diagnosis unit diagnoses a failure
in a case where the detection result of the electrostatic capacitance sensor of the case where the estimation unit estimates that the human body is in contact with the steering wheel exceeds a first threshold value, and
in a case where the detection result of the electrostatic capacitance sensor of the case where the estimation unit estimates that the human body is in no contact with the steering wheel is lower than a second threshold value.

5. The contact detection device according to claim 4, wherein
the first threshold value and the second threshold value are set, based on the detection result of the electrostatic capacitance sensor before the diagnosis unit diagnoses the failure.

6. The contact detection device according to claim 1, wherein
the vehicle includes an occupant detection unit configured to detect an occupant in the vehicle,
the estimation unit
estimates that the human body is in no contact with the steering wheel in a case where the occupant detection unit detects no occupant, and
the estimation unit
estimates that the human body is in contact with the steering wheel in a case where the occupant detection unit detects the occupant and the vehicle is traveling.

7. The contact detection device according to claim 1, wherein
the vehicle includes:
an opening detection unit configured to detect an opening of a door; and
a door locking unit configured to lock the door to be a closed state, and
the estimation unit
estimates that the human body is in no contact with the steering wheel in a case where the door locking unit releases locking and the opening detection unit detects no opening of the door, and
the estimation unit
estimates that the human body is in contact with the steering wheel in a case where after the opening detection unit detects the opening of the door, the vehicle is traveling.

8. The contact detection device according to claim 1, wherein
the vehicle is capable of conducting automated driving,
the estimation unit
estimates that the human body is in no contact with the steering wheel in a case where the vehicle is in the automated driving and the steering wheel is rotating from a neutral position, and
the estimation unit
estimates that the human body is in contact with the steering wheel in a case where the vehicle is in manual driving and the steering wheel is rotating from the neutral position.

9. The contact detection device according to claim 1, further comprising
a notification unit configured to notify an occupant of a diagnosis result of the diagnosis unit.

10. The contact detection device according to claim 1, wherein the changing unit is configured to change the threshold value by adding a fixed value to a current threshold value when the diagnosis unit determines that an open failure as the failure related to the electrostatic capacitance sensor occurs.

11. The contact detection device according to claim 1, further comprising a storage unit configured to store a detection result of the electrostatic capacitance, as history information, in a case in which the estimation unit estimates the human body is in contact with the steering wheel and the diagnosis unit determines a failure related to the electrostatic capacitance sensor does not occur,
wherein the changing unit is configured to change the threshold value by subtracting a fixed value from a value of the detection result stored in the storage unit as the history information when the diagnosis unit determines that an open failure as the failure related to the electrostatic capacitance sensor occurs.

12. A contact detection device comprising:
an electrostatic capacitance sensor provided on a steering wheel of a vehicle, and configured to detect contact of a human body with the steering wheel; and
at least one processor configured to, by executing a program, perform:
estimating whether the human body is in contact with the steering wheel;
conducting a failure diagnosis related to the electrostatic capacitance sensor, based on a detection result of the electrostatic capacitance sensor in a case where it is estimated in the estimating that the human body is in contact with the steering wheel and a detection result of the electrostatic capacitance sensor in a case where it is estimated in the estimating that the human body is in no contact with the steering wheel;
determining whether the human body is in contact with the steering wheel by comparing a detection result of the electrostatic capacitance sensor with a threshold value; and
changing the threshold value when it is determined in the failure diagnosis that a failure related to the electrostatic capacitance sensor occurs.

* * * * *